Feb. 11, 1969 J. E. HOPKINS 3,426,606
TENSIONING DEVICES FOR CHAINS, BELTS AND THE LIKE
Filed May 12, 1967
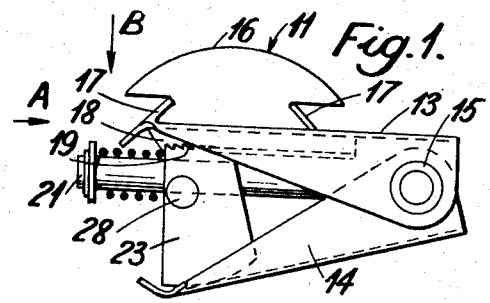
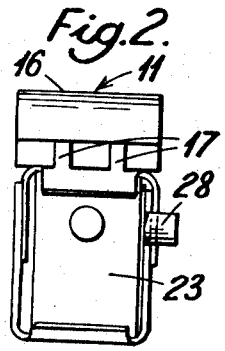
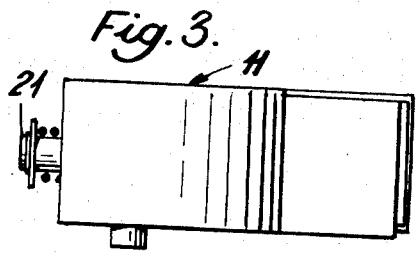
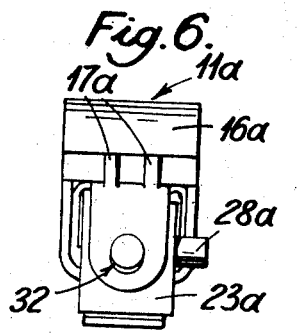
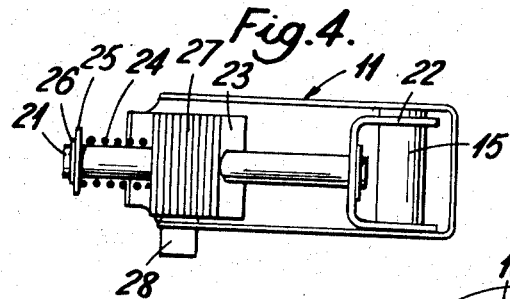
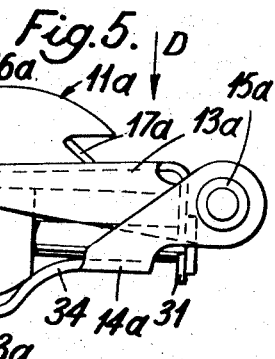
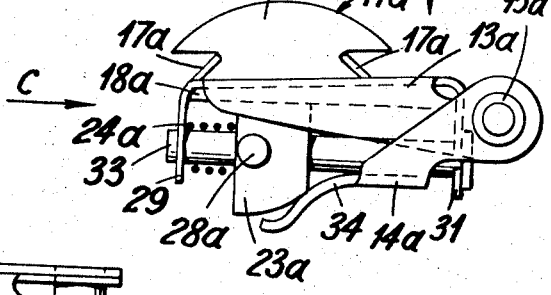
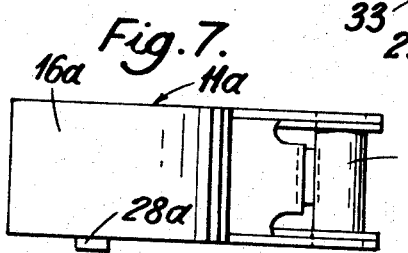

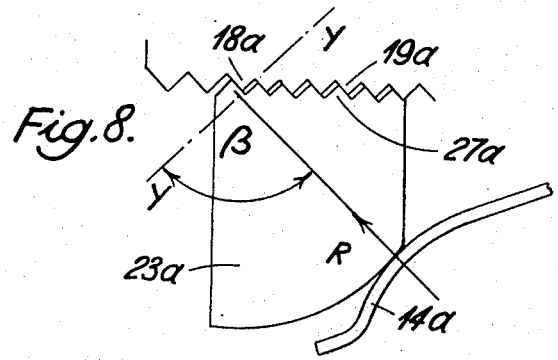
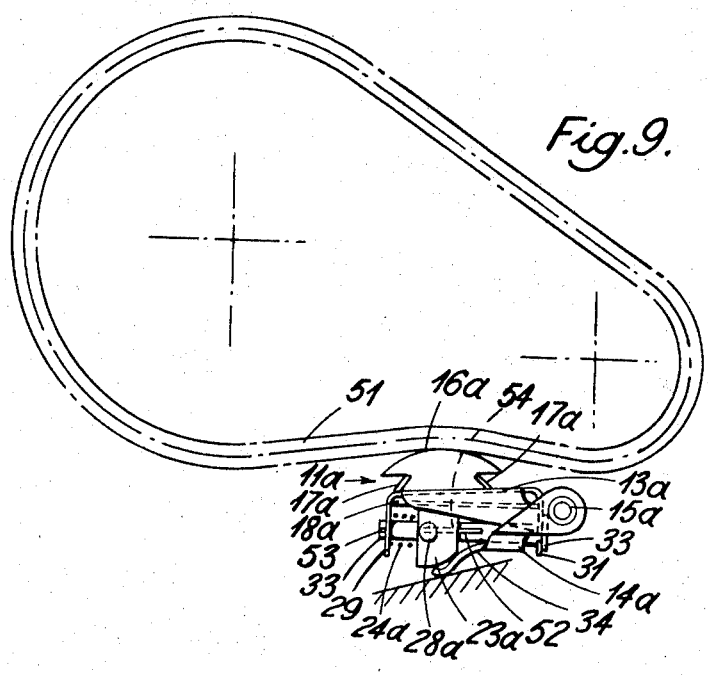
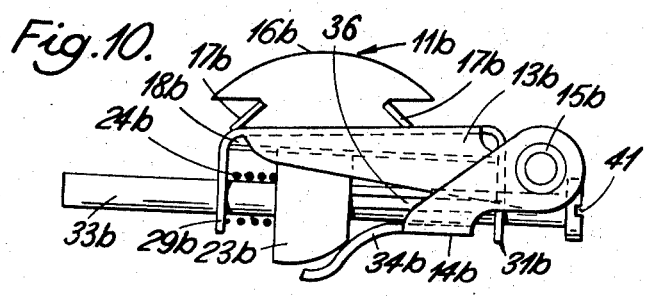

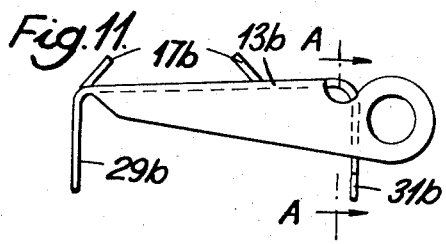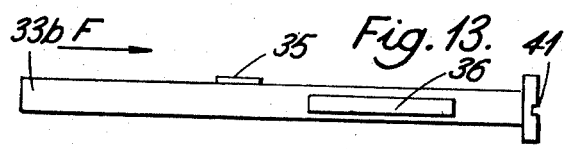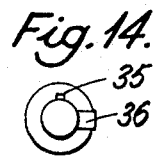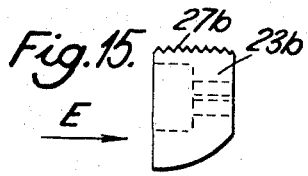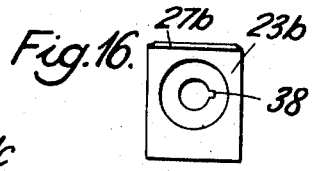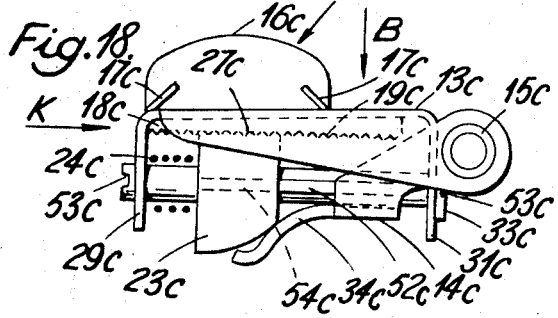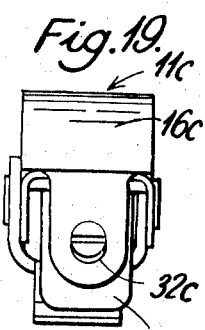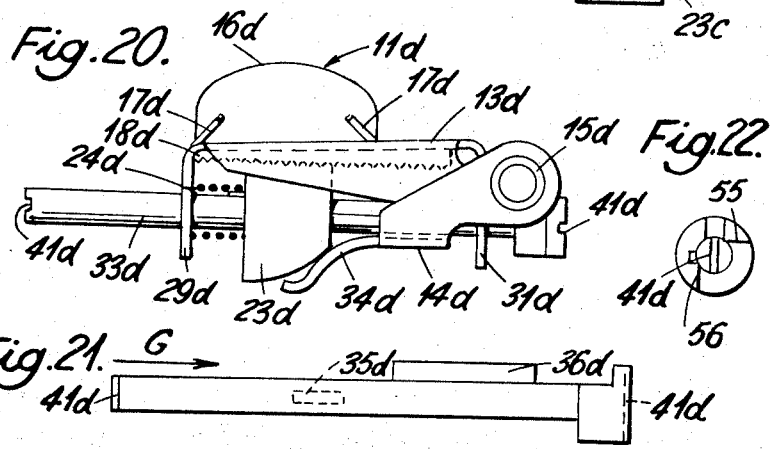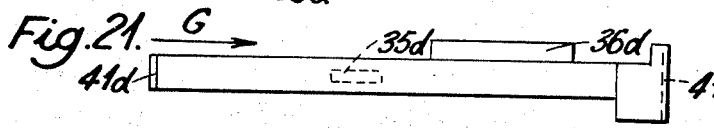

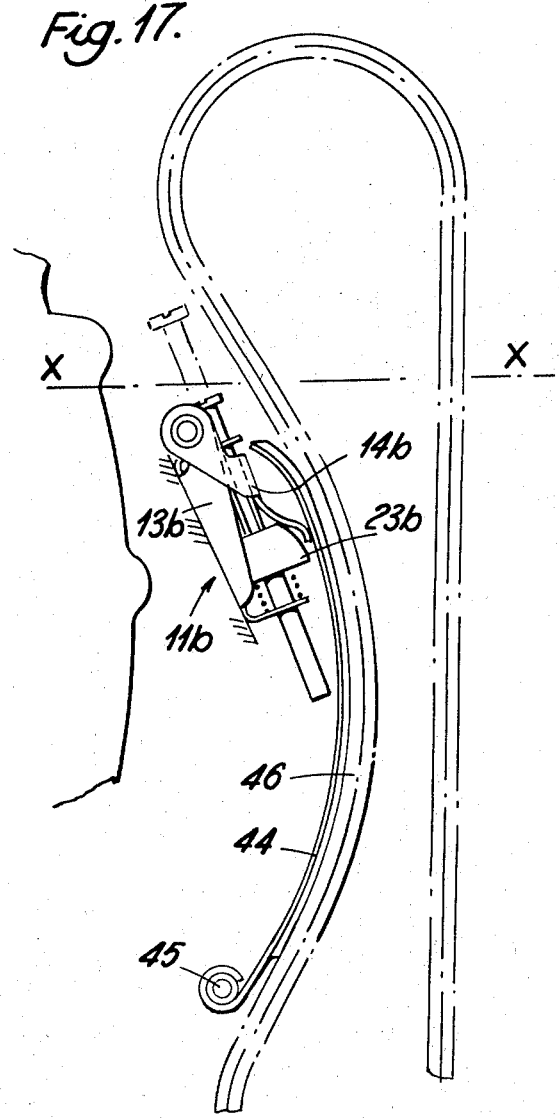

United States Patent Office 3,426,606
Patented Feb. 11, 1969

3,426,606
TENSIONING DEVICES FOR CHAINS,
BELTS AND THE LIKE
John Edward Hopkins, Cheadle, England, assignor to Renold Limited, Manchester, England, a British company
Filed May 12, 1967, Ser. No. 638,106
Claims priority, application Great Britain, May 17, 1966, 21,966/66
U.S. Cl. 74—242.11
Int. Cl. F16b 7/22
12 Claims

ABSTRACT OF THE DISCLOSURE

Chain tensioning device has two arms pivoted together. One arm carries a slipper head which engages against the chain. A wedge member is urged between the arms by a spring to bias the arms apart. One arm carries a slipper head and the other arm reacts against an abutment so that the wedging action causes tensioning pressure to be applied by the slipper head. The wedge member is mounted on a spindle and key and keyway arrangements provide for locking the device in cocked condition.

The invention relates to tensioning devices for chains, belts and like driving elements.

The invention provides a tensioning device for chains, belts or like driving elements, in which tensioning pressure derived from biassing means is applied through a wedging device to a tensioning member adapted to apply the tensioning pressure to the chain, belt or like driving element, the wedging device and the member being mounted together in a single unit adapted to be attached directly to a housing or like support adjacent a chain, belt or like driving element so that the member tensions the chain, belt or like driving element.

The invention also provides a tensioning device comprising a pressure-applying member adapted to apply tensioning pressure to a chain, belt or like driving element, a spring or other biassing means from which the tensioning pressure is derived, and a wedging device interposed between the biassing means and the pressure applying member so that pressure is transmitted from the biassing means to the pressure-applying member through a wedging action, the wedging device, the biassing means and the pressure-applying member being mounted together in a single unit adapted to be attached directly to a housing or like support adjacent a chain, belt or like driving element so that the pressure-applying member applies tensioning pressure to the chain, belt or like driving element.

Preferably the pressure applying member is provided with a replaceable part formed with a drive contacting surface.

Preferably a surface of the wedging device which surface applies pressure in the aforesaid wedging action is provided with teeth or is otherwise roughened in such a manner as to resist movement of the wedging device against the action of the biassing means.

Preferably a reaction surface, against which the wedging device reacts when applying pressure in the aforesaid wedging action, is curved to provide a variation in wedging action as the wedging device moves under the action of the bias.

Preferably the curvature of the said reaction surface and the shape and relative arrangement of the wedging device are such that change in bias as the wedging device moves under the action of the bias are compensated, at least partly, by change in the wedging action.

Preferably the member adapted to apply tensioning pressure to a chain, belt or like driving element comprises a pivoted arm.

Preferably the pivoted arm is pivoted to another arm and the wedging device acts between the pivoted arms.

Preferably the device is adapted so that by manual manipulation the wedging device may be moved against the action of the biassing means to cock or re-cock the device, in which state the biassing means is fully energised.

Preferably means are provided for releasably locking the device in the cocked state.

Preferably the wedging device is slidably mounted on a guide and there is provided a member adapted to be movable when the device is cocked with the biassing means fully energised into a locking position in which position movement of the wedging device under the action of the biassing means is resisted.

Preferably the guide comprises a spindle provided with an interengageable key and keyway device, in which the key and keyway when interengaged are movable relatively to permit movement of the wedging device under the action of the biassing means, in which the key and keyway are disengageable when the device is cocked with the biassing means fully energised and are movable out of alignment by rotation of the spindle, and in which the key and keyway device is so arranged that, when so disengaged and out of alignment, movement of the wedging device under the action of the biassing means is resisted so as to lock the device in the cocked state.

Specific constructions of tensioning devices embodying the invention will now be described by way of example and with reference to the accompanying drawings in which:

FIGURE 1 is a front elevation of a tensioning device,
FIGURE 2 is an end elevation of the tensioning device shown in FIGURE 1 in the direction of arrow A,
FIGURE 3 is a plan view of the tensioning device shown in FIGURE 1 in the direction of arrow B,
FIGURE 4 is a plan view of the tensioning device shown in FIGURE 1 in the direction of arrow B with some parts omitted,
FIGURE 5 is a front elevation of another tensioning device,
FIGURE 6 is an end view of the tensioning device shown in FIGURE 5 in the the direction of arrow C,
FIGURE 7 is a plan view of the tensioning device shown in FIGURE 5 in the direction of arrow D,
FIGURE 8 is an enlarged diagrammatic view of part of the tensioning device shown in FIGURE 5,
FIGURE 9 is a front elevation of a modification of the tensioning device of FIGURE 5, shown positioned for tensioning a chain drive,
FIGURE 10 is a front elevation of another tensioning device,
FIGURE 11 is a front elevation of part of the tensioning device shown in FIGURE 10,
FIGURE 12 is a part section on the line A—A of FIGURE 11,
FIGURE 13 is a front elevation of another part of the tensioning device shown in FIGURE 10,
FIGURE 14 is a view in the direction of arrow F of the part shown in FIGURE 13,
FIGURE 15 is a front elevation of another part of the tensioning device shown in FIGURE 10,
FIGURE 16 is a view in the direction of arrow E of the part shown in FIGURE 15,
FIGURE 17 is a front elevation of the tensioning device shown in FIGURE 10 arranged for tensioning, in conjunction with a tensioning strip, a long centre distance chain drive,
FIGURE 18 is a front elevation of a further modification of the tensioning device of FIGURE 5,
FIGURE 19 is an end elevation of the tensioning device shown in FIGURE 18 in the direction of arrow K, FIGURE 20 is a front elevation of a modification of the tensioning device of FIGURE 10, FIGURE 21 is a front elevation of a part of the tensioning device shown in FIGURE 20, and FIGURE 22 is a view in the direction of arrow G of the part shown in FIGURE 21.

In these examples of tensioning devices 11, 11a, 11b, 11c, 11d for chains, belts and the like, two arms are pivoted together and are urged apart to provide the tensioning pressure by means of a wedging device biassed by a spring which tends to drive the wedging device between the arms to urge the arms apart with a wedging action.

In the example of tensioning device 11 shown in FIGURE 1, two arms 13, 14 are pivoted together by a hollow pin 15. A drive contacting surface on a slipper head 16 has formed in its base a dovetail which is clamped between tabs 17 to secure the slipper head to the arm 13. The tabs 17 are formed integrally with the arm 13. The slipper head 16 may be of rubber, plastic or other suitable material.

A rack 18 is rigidly fixed to the arm 13 on the opposite side of the arm 13 to the slipper head 16. The rack has serrations 19 cut into its surface remote from the slipper head 16. One end of a spindle 21 is attached to a bracket 22 (see FIGURE 4) which is mounted on the hollow pin 15 and is free to rotate on the pin 15 within the two arms 13, 14. A wedge member 23 is mounted on the spindle 21 so as to be capable of sliding along the axis of the spindle 21. A helical coil spring 24 on the spindle 21 acts between a washer 25 secured on the end of the spindle 21 by a circlip 26 and the wedge member 23 to bias the wedge member 23 towards the hollow pin 15.

The helical coil spring 24 tends to drive the wedge member 23 between the arms 13, 14. One surface on the wedge member 23 engages against the rack 18 and another surface on the wedge member 23 engages against the inner surface of arm 14. The surface of the wedge member 23 which engages against the rack 18 has serrations 27 cut into it and the surface of the wedge member 23 which engages against the arm 14 is smoothly curved.

When employed for tensioning the timing chain of a motor vehicle engine, the tensioning device is mounted with the slipper head 16 in contact with the chain. It can often be arranged so that the arm 14 is then in contact with the engine cylinder block and the arm 14 is thereby restrained from movement by the aforesaid wedging action. The device is bolted in position through hollow pin 15. For tensioning other chain, belt or like drives, the device is mounted so that when the slipper head 16 engages the driving element the arm 14 is in contact with any conveniently positioned fixed member such as, for example, a chain-case. If necessary, a stop for the arm 14 has to be provided.

As the chain, belt or like driving element wears, the wedge member 23 is driven between the arms 13, 14 by the helical coil spring 24. Since arm 14 is restrained by the cylinder block, chaincase or other member, the resultant wedging action, in which the arms 13, 14 are urged apart in a direction transverse to that in which the wedge member 23 is driven, forces the slipper head 16 against the driving element thereby taking up slack. Reverse movement of the wedge member 23 against the bias of the helical coil spring 24 is resisted by the engagement of the serrations 19 on the rack 18, with the serrations 27 on the wedge member 23. The interengaging serrations 19 and 27 are arranged to permit a limited amount of return movement of the arm 13 in the opposite sense to that in which it is urged by the spring 24 and wedge member 23. This is an important feature as tensioning devices should not resist return movement too positively in order that fluctuations due to inherent variation of drive length of the driving element are accommodated. The amount of such permitted return movement may be altered by altering the tooth size of the serrations and/or shape of the serrations.

In this example the serrations 27 and 19 are shaped so that movement of the wedge member 23 over the rack 18 against the bias of the helical coil spring 24 is possible by a manual manipulation involving disengaging the serrations 19 from the serrations 27 and firmly pulling the wedge member 23 back by hand. This re-cocking of the device is facilitated by the provision of a peg 28 on the wedge member 23.

In the example shown in FIGURE 5 parts which correspond to parts in the example shown in FIGURE 1 have been marked with the same reference numbers, distinguished by suffix "a."

In this example shown in FIGURE 5, bent over portions at each end of the arm 13a form lugs 29, 31. Each lug has an elongated hole as at 32 (FIGURE 6) and a headed spindle 33 projects through the holes in the lugs 29, 31. The holes in the lugs are so positioned that the head of the spindle 33 lies between the lug 31 and the pin 15a, whereby the spindle is loosely held in position. In this example the spring 24a which urges the wedge member 23a to move along spindle 33, on which the wedge member 23a is slidably mounted, acts between the lug 29 and the wedge member 23a.

The arm 14a has a substantially curved portion 34 providing a reaction surface upon which the curved surface of the wedge member 23a bears as it is urged along the spindle 33. As the wedge member 23a moves towards the head of the spindle 33, the point of contact between wedge member 23a and arm 14a changes. The curved inter-engaging surfaces are, in this example, so shaped that the wedging action is increased as the wedge member 23a moves closer to the head of the spindle 33. This increase in wedging action tends to compensate for the decrease in spring force as the spring 24a extends.

The amount of permitted return movement of the arm 13a in the opposite sense to that in which it is urged by the helical coil spring 24a and wedge member 23a may be altered by altering the tooth size and/or shape of the serrations and may also be altered by altering the shape of either or both of the curved interengaging surfaces of the wedge member 23a and arm 14a.

A further important aspect of the shaping of the curved interengaging surfaces of the wedge member 23a and the arm 14a is illustrated in FIGURE 8. In FIGURE 8 the reaction R between the interengaging curved surfaces makes an angle $\beta$ with the faces, indicated by Y—Y, of the serrations 19a and 27a. The shape of the curved interengaging surfaces is such that the angle $\beta$ is never greater than 90 degrees. Thus, when a drive element exerts a reverse pressure on the tensioning arm 13a the reaction on the wedge member 23a acts to move the serrations 19a and 27a into engagement and reverse movement of the wedge member 23a is prevented. At the same time it is a simple matter to cock the device by pulling on the peg 28a, the shape of the serrations allowing the wedge to be moved manually in either direction along spindle 33.

Relative movement of the arm 13a and spindle 33 in a direction transverse to the axis of the spindle 33 is permitted by the elongation of the holes 32 in the lugs 29 and 31. As is apparent from FIGURE 8, such relative movement is necessary for permitting the serrated wedge member 23a to move over the serrations 19a on the arm 13a.

FIGURE 9 illustrates the manner in which a tensioning device of the kind shown in FIGURE 5 may be employed to tension a chain drive 51. The FIGURE 9 also shows a modification of this tensioning device, the modification providing for cocking and locking the device in energised state, i.e. with helical coil spring 24a fully energised.

The spindle 33 is provided with a small key 52 and means, in this example a screw driver slot 53 in the spindle end for facilitating rotation of the spindle. The wedge member 23a has a keyway 54 which allows passage through it of the key 52. To lock the device the spindle 33 is rotated until the key and keyway are in line, the wedge member 23a is pulled against helical coil spring 24a along the spindle until clear of the keyway and the spindle is then rotated through a few degrees. Movement of the wedge member 23a under the action of the spring 24a is then prevented by engagement of the key with the end wall of the wedge member. The device may then be set into operation by rotating the spindle 33 until the key 52 and keyway 54 are in line. The spring 24a is then permitted to drive the wedge member 23a along the spindle 33 and force the arms apart.

The example shown in FIGURE 10 is a further modification of that shown in FIGURE 5. This further modification is also provided for locking the device in energised state, i.e. with helical coil spring 24b fully energised. As with FIGURE 5, parts shown in FIGURE 10 which correspond to parts shown in FIGURES 1 and 5 are marked with the same reference numbers, distinguished by suffix b.

As with the example shown in FIGURE 5, the wedge member 23b is supported on a headed spindle 33b. However, the headed spindle 33b is longer than headed spindle 33 and is provided with two keys 35 and 36 (see FIGURES 13 and 14). The keys 35 and 36 are positioned spaced apart both along the longitudinal axis of the headed spindle 33b and also by 90 degrees around the circumference of the spindle 33b. The key 35 is narrower than key 36 (see FIGURE 14) and is positioned further from the spindle head.

Adjacent to the elongated hole in lug 31b of the arm 13b there is provided a keyway 37 which is wide enough to permit passage of key 36 (see FIGURES 11 to 14).

FIGURES 15 and 16 show the wedge member 23b which is provided with a keyway 38 which is only wide enough to permit passage of key 35.

To assemble the tensioning device shown in FIGURE 10 the end of the spindle 33b remote from the head is inserted through lug 31b, wedge member 23b and helical coil spring 24b. The spindle 33b is then rotated until key 35 comes in line with keyway 37 on lug 31b and keyway 38 in the wedge member 23b. The spindle 33b is pushed forward, through the hole in lug 29b, until the key 35 is clear of the keyway 38. The spindle 33b is then rotated until key 36 comes in line with keyway 37. Then by pushing the spindle 33b further, the end of the key 36 contacts the wedge member 23b which may thus be moved against the helical coil spring 24b energising the device and permitting the arms 13b, 14b to move together. The device may be locked in this energized condition by pushing the spindle 33b forward until key 36 is pushed through and clear of keyway 37 and then rotating the spindle 33b through a few degrees.

The tensioning device may then be mounted in position adjacent a drive element and set in action by rotating spindle 33b until key 36 is in line with keyway 37. This permits helical coil spring 24b to drive the wedge member 23b together with the spindle 33b towards the right as seen in FIGURE 10 urging the arms 13b and 14b apart with the aforedescribed wedging action. The key 36 slides in the keyway 37 and prevents rotation of spindle 33b.

Thus, as long as the head of the spindle 33b is accessible, the device may readily be re-energised and locked in energised state clear of a drive element adjacent to which it is mounted for tensioning. The head of the spindle 33b is provided with a screw-driver slot 41 for facilitating this operation.

FIGURE 17 illustrates the device shown in FIGURE 10 for tensioning, in conjunction with a tensioning strip 44, a chain drive which, in this example, is to an overhead camshaft in an internal combustion engine. The drive illustrated has a long centre distance, i.e. the centres of the driving and driven shafts are widely spaced and a long strand of chain 46 has to be tensioned.

The tensioning strip 44 is pivoted at 45 is urged against the chain at its end remote from the pivot 45 by arm 14b of a tensioning device 11b. In this example the arm 13b has to be prevented from outward movement and, as shown, has its slipper head removed. The tensioning device is, in this example, bolted onto the cylinder block, the top of which is marked by line X—X.

FIGURES 18 and 19 illustrate a further modification of the tensioning device of FIGURE 5 in which, as with the FIGURE 9 modification, provision is made for locking the device cocked in energised state, i.e. with the helical coil spring energised. Parts shown in FIGURES 18 and 19 which correspond to parts shown in FIGURES 1, 5 and 9 are marked with the same reference numbers, distinguished by suffix c.

Further modifications of the tensioning device of FIGURES 18 and 19 are the omission of peg 28a; the provision of screw driver slots 53c at both ends of the spindle; a different shaped slipper head 16c; and a modified interfitting relationship between the arms 13c and 14c.

In the modification illustrated in FIGURES 20 to 22 parts which correspond to parts shown in FIGURES 1, 5 and 10 are marked with the same reference numbers, distinguished by suffix d.

An enlarged head on the spindle 33d on which head are provided flats 55 and 56 (see FIGURES 21 and 22). Rotation of the spindle 33d more than a few degrees is prevented by means of the flats 55 and 56, which come into contact with hollow pin 15d if spindle 33d is rotated more than a few degrees in either direction. This simplifies the re-location of key 36d in keyway 37 (cf. FIGURE 12).

The further modifications comprise provision of screw driver slots 41d at both ends of the spindle; and a slipper head 16d of the same shape as that shown in FIGURES 18 and 19.

It will be appreciated that when employing the tensioning devices of FIGURES 9, 10, 18 or 20 re-cocking and locking the device is a simple and speedy operation. This is particularly valuable in arrangements of the kind shown in FIGURE 17 in which no special accessibility provisions have to be made to permit the re-cocking and locking operations.

For short or medium centre distance drives, the tensioning devices of FIGURES 10 and 20 are employed with their slipper heads 16b and 16d engaging directly against the drive element.

It will be appreciated that tensioning devices as shown in FIGURES 1, 5, 9, 18 and 20 may be used in conjunction with tensioning strip.

The components of the tensioning devices of these examples can be made from metal and where appropriate, from plastics material. The components may be pressings or, where appropriate, mouldings so that the devices of these examples are simple to manufacture, light and comparatively cheap.

The slipper heads may be replaced or changed for heads of different shape.

The devices of these examples only require one fixing point, although it may be necessary to provide a stop for the arm 14, 14a, 14b, 14c, 14d (or in FIGURE 17 arrangements for the arm 13, 13a, 13b, 13c, 13d).

The tensioning devices of these examples are compact, require comparatively little space additional to that taken up by the chain drive, and do not require a pressure supply of oil for operation.

The invention is not restricted to the details of the foregoing examples. For instance, the rack need not necessarily be separate but may for example be formed integrally with the arm 13, 13a, 13b, 13c or 13d. Alternatively rack teeth may be cut directly in the underside of the arm 13, 13a, 13b, 13c, 13d. The slipper head need not necessarily be secured to the arm by a dovetail joint but may be secured by any suitable means. The arm and slipper head may be formed integrally in some suitable material. The tabs 17, 17a, 17b, 17c, 17d may, for example, be riveted or welded to arm 13, 13a, 13b, 13c, 13d. The spring which acts on the wedge member need not necessarily be a compression spring but may, for example, be a tension spring arranged to pull the wedge member between the arms. The means for facilitating rotation of the spindle 33, 33b, 33c or 33d need not necessarily be a screw driver slot but may, for example, be a hexagon for a spanner or a socket for an Allen key.

I claim:

1. A tensioning device comprising two arms pivoted together by a hollow pin, a drive contacting surface on a slipper head having formed in its base a dovetail which is clamped between tabs to secure the slipper head to one arm, the tabs being formed integrally with the said one arm, the slipper head being of rubber or plastic, a rack rigidly fixed to the said one arm on the opposite side of the arm to the slipper head, the rack having serrations cut into its surface remote from the slipper head, a spindle having one end attached to a bracket which is mounted on the hollow pin and is free to rotate on the hollow pin within the two arms, a wedge member being mounted on the spindle so as to be capable of sliding along the axis of the spindle, a helical coil spring on the spindle acting between a washer secured on the end of the spindle by a circlip and the wedge member to bias the wedge member towards the hollow pin, the helical coil spring tending to drive the wedge member between the arms, one surface on the wedge member engaging against the rack and another surface on the wedge member engaging against the inner surface of the other said arm, the surface of the wedge member which engages against the rack having serrations cut into it and the surface of the wedge member which engages against the other said arm being smoothly curved, the tensioning device being mounted, when employed for tensioning the timing chain of a motor vehicle engine, with the slipper head in contact with the chain and preferably with the said other arm in contact with the engine cylinder block whereby the arm is restrained from movement by the aforesaid wedging action, the device being bolted in position through the said hollow pin, the wedge member being driven, as the chain, belt or like driving element wears, between the two arms by the helical coil spring, the said other arm being restrained by the cylinder block, chaincase or other member, the resultant wedging action, in which the two arms are urged apart in a direction transverse to that in which the wedge member is driven, thereby forces the slipper head against the driving element thereby taking up slack, reverse movement of the wedge member against the bias of the helical coil spring being resisted by the engagement of the serrations on the rack with the serrations on the wedge member, the interengaging serrations being arranged to permit a limited amount of return movement of the said one arm in the opposite sense to that in which it is urged by the spring and wedge member, whereby fluctuations due to inherent variation of drive length of the driving element are accommodated, the serrations being shaped so that movement of the wedge member over the rack against the bias of the helical coil spring is possible by a manual manipulation involving disengaging the serrations and firmly pulling the wedge member back by hand, thereby to re-cock the device, there being provided a peg on the wedge member for facilitating this action.

2. A tensioning device comprising, as a unit, two arms, pivot means pivoting said arms together about a pivot axis, one of said arms presenting a drive contacting surface to apply tensioning pressure to a drive, a guide connected with and extending between said arms, a wedge member slidably mounted by said guide and drivable therealong between said arms to force said arms angularly apart, spring biasing means from which said tensioning pressure is to be derived, the spring biasing means acting to drive said wedge member along said guide, and inter-engaging teeth on said wedge member and one of said arms respectively, said inter-engaging teeth allowing only a limited return movement of said wedge member along said guide against the action of said spring biasing means.

3. A tensioning device as claimed in claim 2 wherein the spring biasing means acts to drive said wedge member along said guide with a spring force which reduces as said arms are forced apart, and a reaction surface on one of said arms, against which the wedge member reacts when transmitting tensioning pressure from the spring biasing means, is profiled to increase the wedging action as the spring force is reduced.

4. A tensioning device as claimed in claim 2 wherein said guide is pivoted with respect to said arms on said arm pivot axis.

5. A tensioning device as claimed in claim 2 wherein said guide is carried by said one of said arms so as to be bodily movable towards and away therefrom to an extent sufficient to permit ratcheting of said teeth.

6. A tensioning device as claimed in claim 2 wherein said guide is a spindle rotatable in a bore in said wedge, said wedge member presents an end wall adjacent said bore and locking means is provided to lock the wedge member in a position in which said spring biasing means is fully energized, the locking means comprising a key on said spindle and a keyway for said key in the wedge member, the spindle being rotatable with respect to the wedge member when the spring biasing means is fully energized with the key in engagement with said end wall and preventing movement of the wedge member along the spindle.

7. A tensioning device as claimed in claim 2 wherein there is provided a part fixed with respect to one of said arms and having a bore extending therethrough, said guide is a spindle rotatable in and movable through said bore, said part presents a wall adjacent said bore and locking means is provided to lock the wedge member in a position in which said spring biasing means is fully energized, the locking means comprising a key on said spindle and a keyway for the key in said part, the spindle being rotatable with respect to said part when the spring biasing means is fully energized with the key in engagement with said wall and preventing movement of the spindle through said bore in said part.

8. A tensioning device as claimed in claim 7 wherein the spindle has a further key angularly offset from said first said key thereon, the spindle is rotatable in a bore in said wedge member, said wedge member presents an end wall adjacent said bore in said wedge member, the wedge member has a keyway for said further key, the keyway in the wedge member and the keyway in said part being in line and the spindle being rotatable with respect to the wedge member when the spring biasing means is fully energized with said further key in engagement with said end wall of said wedge member the keys then locating the spindle axially with respect to the wedge member.

9. A tensioning device as claimed in claim 8 wherein means is provided limiting the range of angular movement afforded to the spindle with respect to said part to misalign said first said key with the keyway in said part and lock the device in a state in which the spring biasing means is fully energized.

10. A tensioning device comprising two arms pivoted together by a hollow pin, a drive contacting surface on a slipper head having formed at its base a dovetail which is clamped between tabs to secure the slipper head to one arm, the tabs being formed integrally with said one arm, the slipper head being of rubber or plastics material, a rack rigidly fixed to the said one arm on the opposite side of said one arm to the slipper head, the rack having serrations cut into its surface remote from the slipper head, lugs formed by bent over portions at each end of said one arm, each lug having an elongated hole, a spindle projecting through the holes in the lugs, means retaining the spindle in engagement with the holes in the lugs whereby the spindle is loosely held in position between the two arms, a wedge member being mounted on the spindle so as to be capable of sliding along the axis of the spindle, a helical coil spring on the spindle acting between said other lug and the wedge member to bias the wedge member towards the hollow pin, the helical coil spring tending to drive the wedge member between the arms, one surface on the wedge member engaging against said rack and another surface on the wedge member engaging against the inner surface of the other said arm, the surface of the wedge member which engages against the rack having serrations cut into it and the surface of the wedge member which engages against the other said arm being smoothly curved, said other arm having a substantially curved portion providing a reaction surface upon which said smoothly curved surface of the wedge member bears as it is urged along the spindle, whereby as the wedge member moves towards the hollow pin the point of contact between wedge member and the said other arm changes, the curved interengaging surfaces being so shaped that the wedging action is increased as the wedge member moves closer to the hollow pin, the increase in wedging action tending to compensate for the decrease in spring force as the spring extends, the tensioning device being mounted, when employed for tensioning the timing chain of a motor vehicle engine, with the slipper head in contact with the chain and preferably with said other arm in contact with the engine cylinder block whereby the arm is restrained from movement by the aforesaid wedging action, the device being bolted in position through said hollow pin, the wedge member being driven as the chain, belt or like driving element wears, between the two arms by the helical coil spring, the said other arm being restrained by the cylinder block, chain case or other member, the resultant wedging action, in which the two arms are urged apart in a direction transverse to that in which the wedge member is driven, thereby forces the slipper head against the driving element thereby taking up slack, reverse movement of the wedge member against the bias of the helical coil spring being resisted by the engagement of the serrations on the rack with the serrations on the wedge member, the inter-engaging serrations being arranged to permit a limited amount of return movement of the said one arm in the opposite sense to that in which it is urged by the spring and wedge member, whereby fluctuation due to inherent variation of drive length of the driving element are accommodated, the serrations being shaped so that movement of the wedge member over the rack against the bias of the helical coil spring is possible by a manual manipulation involving disengaging the serrations and firmly pulling the wedge member back by hand, thereby to re-cock the device, there being provided a peg on the wedge member for facilitating this action.

11. A tensioning device as claimed in claim 10 wherein the spindle is provided with a small key and a screw driver slot in the spindle for facilitating rotation of the spindle, the wedge member having a keyway which allows passage through it of the key, whereby to lock the device, the spindle is rotated until the key and keyway are in line, the wedge member is pulled against the helical coil spring along the spindle until clear of the keyway and the spindle is then rotated through a few degrees, movement of the wedge member under the action of the spring being then prevented by engagement of the key with the end wall of the wedge member, the device being adapted to be subsequently set into operation by rotating the spindle until the key and keyway are in line, the spring being then permitted to drive the wedge member along the spindle and force the arms apart.

12. A tensioning device as claimed in claim 11 wherein the spindle has a further key, said keys being spaced apart along the longitudinal axis of the spindle and by 90° around the circumference of the spindle, the first said key being narrower than said further key and being positioned further from said hollow pin, said lug adjacent said hollow pin having a keyway wide enough to permit passage of said further key.

References Cited

UNITED STATES PATENTS

| 1,832,958 | 11/1931 | Bachle | 74—242.11 XR |
| 1,861,133 | 5/1932 | Reid | 74—242.11 |
| 2,210,276 | 8/1940 | Bremer | 74—242.11 |
| 3,117,463 | 1/1964 | Brindle | 74—242.11 |
| 3,242,751 | 3/1966 | Whitham | 74—242.11 |
| 3,285,085 | 11/1966 | Graham | 74—242.14 |
| 3,358,522 | 12/1967 | Poyser et al. | 74—242.11 |
| 3,365,969 | 1/1968 | Chessare | 74—242.12 |

FRED C. MATTERN, JR., *Primary Examiner.*

J. A. WONG, *Assistant Examiner.*